(12) United States Patent
McGibney

(10) Patent No.: US 6,970,416 B1
(45) Date of Patent: Nov. 29, 2005

(54) OFDM SYSTEM WITH SIMPLE TERMINALS

(75) Inventor: Grant McGibney, Calgary (CA)

(73) Assignee: Telecommunications Research Laboratories, Edmonton (CA)

( * ) Notice: Subject to any disclaimer, the term of this patent is extended or adjusted under 35 U.S.C. 154(b) by 792 days.

(21) Appl. No.: 09/617,596

(22) Filed: Jul. 7, 2000

(51) Int. Cl.[7] .............................................. H04J 11/00
(52) U.S. Cl. ..................................... 370/203; 370/480
(58) Field of Search ............................... 370/203, 208, 370/210, 310, 343–344, 464, 480–481, 497, 370/482, 488, 329, 484, 206, 207; 375/308

(56) References Cited

U.S. PATENT DOCUMENTS

| | | | |
|---|---|---|---|
| 5,828,660 A | 10/1998 | Baum et al. | 370/330 |
| 6,125,124 A * | 9/2000 | Junell et al. | 370/503 |
| 6,160,791 A * | 12/2000 | Bohnke | 370/208 |
| 6,169,751 B1 * | 1/2001 | Shirakata et al. | 370/480 |
| 6,172,993 B1 * | 1/2001 | Kim et al. | 370/516 |
| 6,282,167 B1 * | 8/2001 | Michon et al. | 370/203 |
| 6,314,083 B1 * | 11/2001 | Kishimoto et al. | 370/210 |
| 6,347,071 B1 * | 2/2002 | Cupo et al. | 370/203 |
| 6,377,566 B1 * | 4/2002 | Cupo et al. | 370/343 |
| 6,430,148 B1 * | 8/2002 | Ring | 370/208 |
| 6,522,700 B1 * | 2/2003 | Zimmermann et al. | 375/295 |

FOREIGN PATENT DOCUMENTS

| | | |
|---|---|---|
| EP | 0 702 466 A2 | 3/1996 |
| EP | 0 961 448 A2 | 12/1999 |
| EP | 0 961 448 A3 | 8/2000 |

OTHER PUBLICATIONS

An Asymmetrical Implementation of a High Speed Wireless LAN, G.H. McGibney and S.T. Nichols, paper published Apr. 16, 1997, at the Canadian Conference For Broadband Research '97, Ottawa, 9 pages.

An Asymmetrical Implementation of a High Speed Wireless LAN, G.H. McGibney and S.T. Nichols, paper published Jul. 9, 1997, at Wireless'97, Calgary, 12 pages.

Photocopy of the official filing certificate and disclosure of U.S. Appl. No. 09/060,759, filed Apr. 15, 1998, Inventor G. McGibney, titled: Asymmetric Equalization System for Data Transmission.

Photocopy of the official filing certificate and disclosure of Canadian patent application No. 2,234,777, filed Apr. 15, 1998, Inventor G. McGibney, titled: Asymmetric Equalization System for Data Transmission.

(Continued)

*Primary Examiner*—Chau Nguyen
*Assistant Examiner*—Blanche Wong
(74) *Attorney, Agent, or Firm*—Christensen O'Connor Johnson Kindness PLLC

(57) ABSTRACT

This invention is a wireless network based on orthogonal frequency division multiplexing (OFDM) and simple terminals. In a conventional OFDM system, the signal processing hardware is divided equally between the base station and the terminal. In this invention, most of the complex signal processing hardware is shifted to the base station, making the terminal a simpler and more power-efficient device. To send information to the base station, the terminal transmits a series of QPSK symbols that make up an OFDM-code. The code is designed to distribute the signal's energy into a number of OFDM sub-carriers which can be detected and combined within the base station's OFDM receiver. Other users transmit the same OFDM-codes within the same bandwidth and at the same time, but with slightly offset carrier frequencies. Because of the nature of OFDM, the codes from different users remain orthogonal, even in a multipath radio environment. OFDM signals transmitted from the base station are detected at the terminal using a decimator-accumulator structure.

15 Claims, 11 Drawing Sheets

OTHER PUBLICATIONS

Oo, T.T., et al., "Performance of Turbo-Coded MC-CDMA for Indoor Wireless Applications," *Proceedings of the Third International Symposium on Wireless Personal Multimedia Communications* 2:666-670, Bangkok, Thailand, Nov. 12-15, 2000.

Lee, D., et al., "Antenna Diversity for an OFDM System in a Fading Channel," *Proceedings of Conference on Military Communications* 2:1104-1109, Atlantic City, New Jersey, Oct. 31-Nov. 3, 1999.

"Asymmetric Orthogonal Frequency Division Multiplexing" by G.H. McGibney and S.T. Nichols, TR Labs, Calgary, Canada, published at the Wireless 2000 Conference Jul. 10, 2000, in Calgary, Alberta, Canada.

"Wireless Networking with Simple Terminals", Chapter 6 and Appendices B and C, of Thesis of Grant McGibney, p. 108-130, p. 150-155, to be published May 17, 2001.

* cited by examiner

OFDM SYSTEM WITH SIMPLE TERMINALS

FIELD OF THE INVENTION

This invention relates to OFDM communication systems.

BACKGROUND OF THE INVENTION

This invention applies to wireless networks with a central base station and a number of terminals. There are several ways that the terminals can share the radio resources of the base station including frequency division multiplexing (FDM) time division multiple access (TDMA) and code division multiple access (CDMA). A special type of FDM known as orthogonal frequency division multiplexing (OFDM) has a number of desirable properties including the ability to handle large capacity networks and good spectral efficiency. The major problem with OFDM is that it requires a large amount of digital signal processing hardware to implement, which makes OFDM more costly and power consuming than other types of multiple access. This invention is an adaptation of OFDM where only the base station requires the complex OFDM hardware. The terminals use much simpler hardware, which makes them less expensive and more power efficient.

SUMMARY OF THE INVENTION

This invention is a wireless network that is based on the principles of orthogonal frequency division multiplexing (OFDM). The network divides its radio bandwidth into a large number of smaller radio channels called sub-carriers. Each sub-carrier is centered at a different frequency and is independent of all the other sub-carriers. The network's base station transmits information to all the terminals at once by placing information destined for different terminals on different sub-carriers. Each terminal receives the entire OFDM signal and then uses special signal processing algorithms to separate its sub-carriers from the unwanted sub-carriers belonging to the other terminals. When the terminals transmit their signals back to the base station, each terminal transmits on only a few of the available sub-carriers. Since each terminal in the network is assigned a different set of sub-carriers, they can all communicate with the base station simultaneously. When the signals arrive at the base station's antenna they combine into a single OFDM signal that can be separated within the base station using an OFDM receiver.

Sending information on a single sub-carrier is not a reliable method of communication. Radio channels have high attenuation at certain frequencies due to a process called multipath fading. If the sub-carrier happens to land at one of these faded frequencies then its information will not arrive at the destination. A more reliable method is to transmit the same information on several sub-carriers. This way if one sub-carrier is lost to a multipath fade, the other sub-carriers will still get the information through. This invention uses multiple sub-carriers to carry information both to and from the terminals.

OFDM transceivers process their signals using Fourier transform techniques. A discrete Fourier transform (DFT) is used in the receiver to separate the different sub-carriers, and an inverse discrete Fourier transform (IDFT) is used in the transmitter to generate the OFDM signals. These operations are fairly complex and require a large amount of signal processing hardware to implement. In the base station this is usually not a problem since the costs of base station hardware are shared among the entire network, and the base station usually has access to an external power source. Terminal hardware implementations are more restrictive. Since wireless terminals are usually mobile and battery powered, power consumption is a critical design concern. Removing hardware from the terminal and reducing its power consumption allows it to operate for longer periods on smaller batteries. Removing complex hardware also makes the terminal smaller, lighter, and less expensive.

In this invention, the terminals use very simple hardware to communicate with the complex hardware in the base station. Instead of using an IDFT in the transmitter to generate sub-carriers, the terminal sends a sequence of QPSK symbols that make up an OFDM-code. These codes are designed so that they appear as several sub-carriers to the base station's OFDM receiver. Other terminals in the network transmit the same OFDM-codes but modulate them with slightly different radio frequencies so that their codes arrive at the base station on different sub-carriers. As long as all the terminals use different sets of sub-carriers, their signals will not interfere with each other.

Two simple devices, a decimator and an accumulator, replace the DFT-based OFDM receiver in the terminal. The base station sends information to the terminal on several sub-carriers. The signal is sampled at the terminal and then passed to the decimator. The decimator discards certain specific samples, which causes the sub-carriers destined for this terminal to combine into a single sub-carrier. The accumulator, which adds up the remaining samples, separates this combined sub-carrier from the other terminals' sub-carriers. From the output of the accumulator, the terminal extracts the information from the base station. For this decimator-accumulator structure to work, the base station must first prepare the signal by adjusting the phases of the sub-carriers so that they arrive at the terminal in-phase and combine constructively during decimation.

Further summary of the invention is contained in the claims, which are incorporated here by reference.

BRIEF DESCRIPTION OF THE DRAWINGS

There will now be described preferred embodiments of the invention, by reference to the drawings by way of illustration only, in which like reference characters denote like elements, and in which.

DETAILED DESCRIPTION OF PREFERRED EMBODIMENTS

Figure 1:
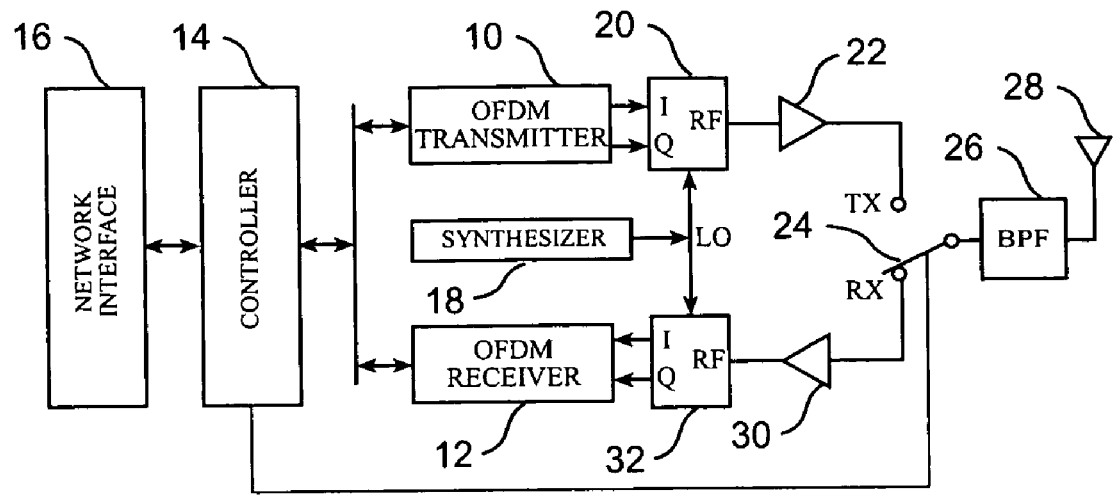
FIG. 1 is a schematic of the base station in the preferred embodiment.

FIG. 1 shows the preferred embodiment of the base station. The base station contains a standard OFDM transmitter 10 to generate the OFDM sub-carriers sent to the various terminals, and a standard OFDM receiver 12 to demodulate the signals from the terminals. Both transmitter and receiver are connected to a microcontroller 14 by a common data bus. The microcontroller handles the multiplexing and demultiplexing of the different terminals' information into a common OFDM signal, the allocation of sub-carriers to different terminals, channel estimation, data encoding and decoding, and diversity combining. The microcontroller sends and receives its information from a network interface 16, which interfaces the terminals' data to outside voice and/or data networks.

A radio frequency synthesizer 18 outputs a carrier wave at the center frequency of the base station. A quadrature modulator 20 converts the baseband signal from the OFDM transmitter 10 to a radio frequency signal centered at the frequency established by the synthesizer 18. The signal is amplified by a linear power amplifier 22. A duplex switch 24 (shown in the transmit position—TX) connects the power amplifier signal to a bandpass filter 26 and radio antenna 28 to be transmitted.

When the base station is receiving signals from the terminals, the controller 14 changes the duplex switch 24 to the receive position (RX). This connects the antenna 28 and bandpass filter 26 to a low noise amplifier 30. This signal is then passed to a quadrature demodulator 32 to be converted from the radio frequency to baseband. This signal is passed to the OFDM receiver 12 to be converted into individual sub-carriers.

Figure 2:
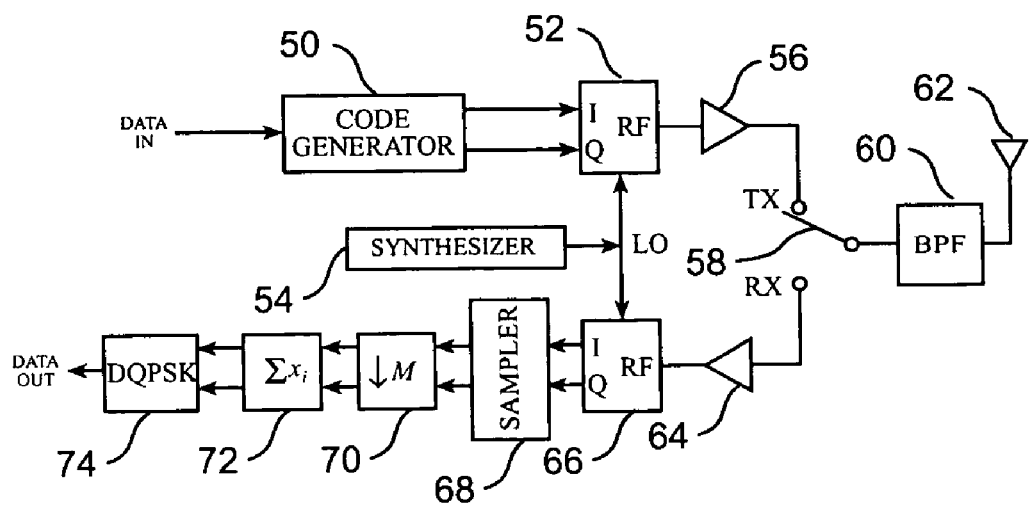
FIG. 2 is a schematic of the terminal in the preferred embodiment.

FIG. 2 shows the preferred embodiment of the terminal. The code generator 50 receives data from the terminal and generates a signal that contains a number of sub-carriers by using an OFDM-code. This signal is passed to quadrature modulator 52 which converts the baseband sub-carriers to radio frequency sub-carriers centered at the frequency generated by the synthesizer 54. The frequency of the synthesizer is adjusted so that the sub-carriers generated by the code generator 50 line up with the sub-carrier frequencies that the base station has allocated this particular terminal. The signal is amplified by a power amplifier 56. A duplex switch 58 (shown in the transmit position—TX) connects the power amplifier signal to a bandpass filter 60 and radio antenna 62 to be transmitted.

The terminal changes the duplex switch 58 to the receive (RX) mode to receive signals from the base station. This connects the antenna 62 and bandpass filter 60 to a low noise amplifier 64. The amplified signal is passed to a quadrature demodulator 66 to be converted from the radio frequency to baseband. The continuous signal from the demodulator is converted to a discrete-time signal by an analog sample and hold device 68. A decimator 70 passes only every M samples and discards the rest. This, as will be shown later, combines all of the sub-carriers destined for this terminal into a single sub-carrier. By adjusting the frequency of the synthesizer 54, this sub-carrier can be made to fall directly at frequency zero. This particular sub-carrier is then extracted from the rest using the analog accumulator 72. The result is passed to a DQPSK decoder 74 to be converted into data bits for the terminal.

Figure 3:
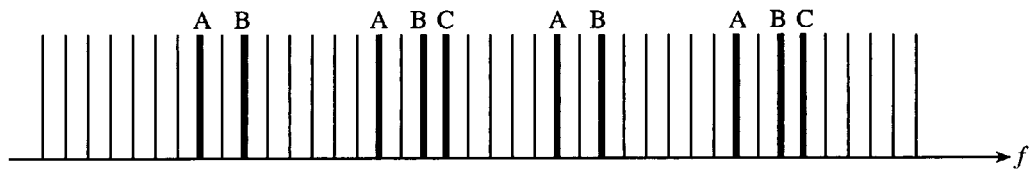
FIG. 3 shows an example of how sub-carriers are distributed among terminals.

The base station divides radio resources among terminals by allocating different terminals different sets of sub-carriers. FIG. 3 shows an example of this in the frequency domain. Each sub-carrier available to the base station is represented by a vertical line. In this example, terminals A and B are each allocated four sub-carriers and terminal C is allocated two. When the terminal and base station exchange information, the same data symbol is sent through each of the assigned sub-carriers. Since no two terminals share a common sub-carrier, the base station can send information to or receive information from all of the terminals simultaneously. It is possible to allocate a terminal a single sub-carrier, but this would not produce very reliable communication. A single sub-carrier is susceptible to multipath fading in the radio channel which may attenuate the signal so much that it can't be decoded. When the signal is spread across more than one sub-carrier and these sub-carriers are spaced far apart in frequency, the chances are not likely that all the sub-carriers will experience multipath fading simultaneously. The more sub-carriers that carry any given terminal's signal, the less likely that the signal will be lost. However, the total number of sub-carriers is limited so there is tradeoff between the number of sub-carriers available to each terminal and the total number of terminals allowed in the system.

Figure 4:
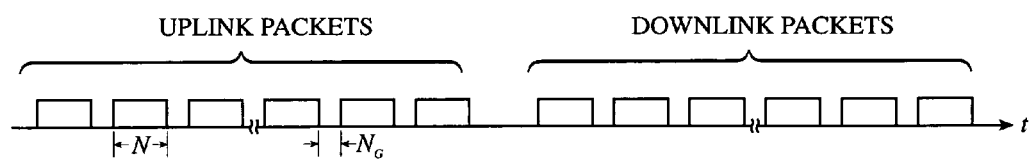
FIG. 4 shows the format of the signals in the time domain.

In the time domain, the base station divides the network time into discrete OFDM packets as shown in FIG. 4. In each OFDM packet, represented as a rectangle, one data symbol is transmitted to or received from each terminal. The packets are N samples long and have a guard time of $N_G$ samples between packets to prevent interference from one packet to the next. The first series of uplink packets are sent from the terminals to the base station. Then the duplex switches 26 and 58 are changed and the downlink packets are sent from the base station to the terminals through the same radio channel. The duplex switches are then changed again and the process repeats itself.

Figure 5:
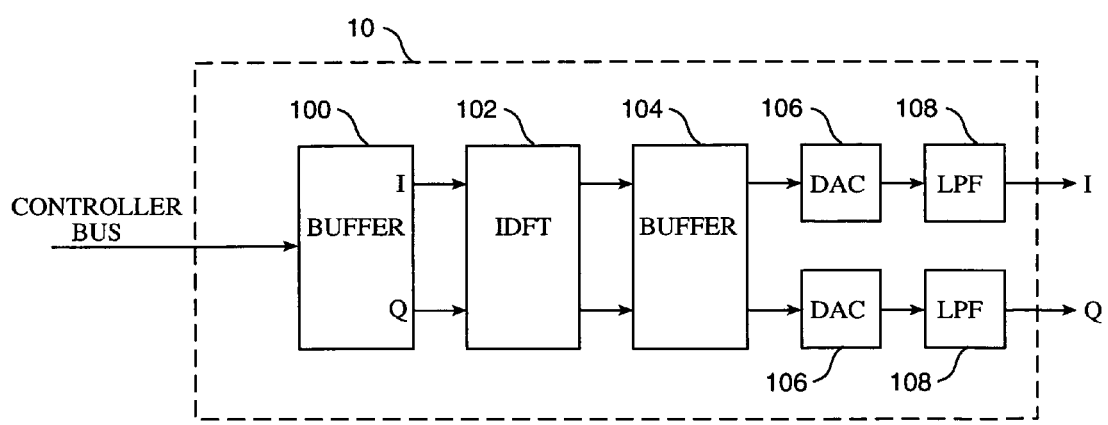
FIG. 5 is a schematic showing details of the OFDM transmitter.
Figure 6:
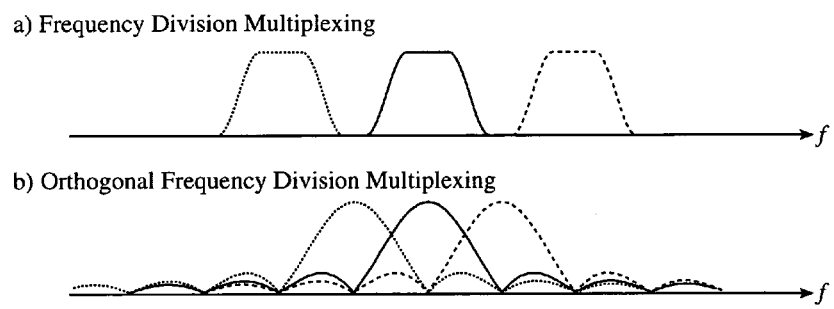
FIG. 6 shows the difference between FDM and OFDM signals.

While several variations of OFDM modulators are known in the art, FIG. 5 shows the preferred embodiment for the OFDM transmitter 10. The key feature of OFDM modulation is the efficiency in which it packs together very narrow channels in the frequency domain. A standard frequency division multiplexing (FDM) spectrum is shown in FIG. 6a. The different channels are filtered to a narrow bandwidth and then modulated to different frequencies by a set of sub-carriers. To keep the signals independent, guard bands are inserted between the sub-channels so that the receiver can filter out individual sub-channels for decoding. While effective, FDM is not a very efficient use of radio spectrum, mainly because of the waste caused by the guard bands.

FIG. 6b shows the spectra of three OFDM sub-carriers defined by $$x_0(n) = \begin{cases} 1 & 0 \leq n < N \\ 0 & \text{otherwise} \end{cases} \quad\quad 1$$

$$x_1(n) = \begin{cases} e^{j2\pi n/N} & 0 \leq n < N \\ 0 & \text{otherwise} \end{cases} \quad\quad 2$$

-continued $$x_2(n) = \begin{cases} e^{j4\pi n/N} & 0 \le n < N \\ 0 & \text{otherwise.} \end{cases} \quad 3$$

The zeroth sub-carrier $x_0(n)$ is a rectangular pulse N samples long, sub-carrier one x, (n) is one cycle of a complex sinusoid, and sub-carrier two $x_2(n)$ is two cycles of a complex sinusoid. Note that between the spectra of these three sub-carriers, there are no guard bands and the signals are packed so closely in frequency that the spectra actually overlap. It is the specific shape of the signal spectra that makes this possible. Each of the three OFDM signals has a spectrum with one main lobe and N−1 zeros spaced at intervals of 2π/N radians around the unit circle. By positioning the signals as in FIG. 2b, the main lobe of each sub-carrier lines up with the zeros of all the other nodes. Therefore at those frequencies, there is no interference between sub-carriers and they are perfectly orthogonal.

Using this method, it is possible to pack up to N independent sub-carriers around the unit circle and modulate a different piece of information on each one. Sub-carrier k with information symbol $m_k$ is expressed as $$x_k(n) = \begin{cases} m_k e^{j2\pi k n/N} & 0 \le n < N \\ 0 & \text{otherwise.} \end{cases} \quad 4$$

When all the sub-carriers are combined together, the result is $$x(n) = \sum_{k=0}^{N-1} x_k(n) \quad 5$$

$$x(n) = \begin{cases} \sum_{k=0}^{N-1} m_k e^{j2\pi k n/N} & 0 \le n < N \\ 0 & \text{otherwise} \end{cases} \quad 6$$

$$x(n) = \begin{cases} N\left[\frac{1}{N}\sum_{k=0}^{N-1} m_k W_N^{-kn}\right] & 0 \le n < N \\ 0 & \text{otherwise.} \end{cases} \quad 7$$

where $W_N = e^{-j2\pi/N}$

In the final form of the OFDM signal (Equation 7) the part within the brackets is the inverse discrete Fourier transform (DFT) of the information sequence. Therefore, the OFDM signal is calculated by applying an inverse-DFT to the set of message symbols and multiplying by N.

Again referring to FIG. 5, the data symbols $M_k$ are transferred from the controller 14 to a memory buffer 100 in preparation for processing. Once the memory buffer is full, the real and imaginary components of the sub-carriers are transferred to an inverse-DFT calculating unit 102, which calculates the first N samples of the OFDM packet using the fast Fourier transform algorithm. The result is transferred to another buffer 104, where an additional NG zero samples are appended that make up the guard time. At the start of the packet, the contents of this buffer are clocked out through digital-to-analog converters 106 and lowpass antialiasing filters 108 to produce the analog OFDM output signal.

Figure 7:
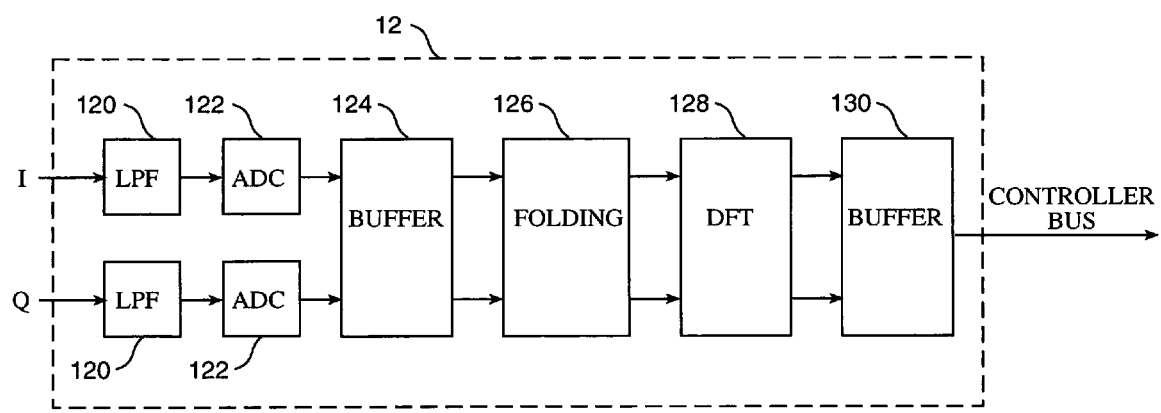
FIG. 7 is a schematic showing details of the OFDM receiver.

FIG. 7 shows the preferred embodiment for the OFDM receiver 12. The main element in the OFDM receiver is the DFT calculating unit 128, which computes the frequency spectrum of the signal at the points around the unit circle where the sub-carriers are orthogonal. The output of the DFT is a set of complex numbers representing the amplitude and phase of each of the sub-carriers. Before the DFT can be applied, the analog signal is filtered by lowpass antialiasing filters 120, sampled with analog-to-digital converters 122, and the result stored in a memory buffer 124. The total length of an OFDM packet (including the guard band) is N+$N_G$ samples, but the DFT algorithm will only accept N samples as an input. The folding unit 126 passes the information from the buffer 124 to the DFT unit 128. To reduce the signal to N samples, it removes the last NG samples from the end of the sequence and adds them to the first $N_G$ samples. This effectively folds any signal that may have been dispersed into the guard band by the radio channel back around to the start of the signal. Once the DFT unit 128 completes the transform, the resulting complex sub-carrier amplitudes are stored in another buffer 130 where they can be accessed by the controller 14.

Figure 8:
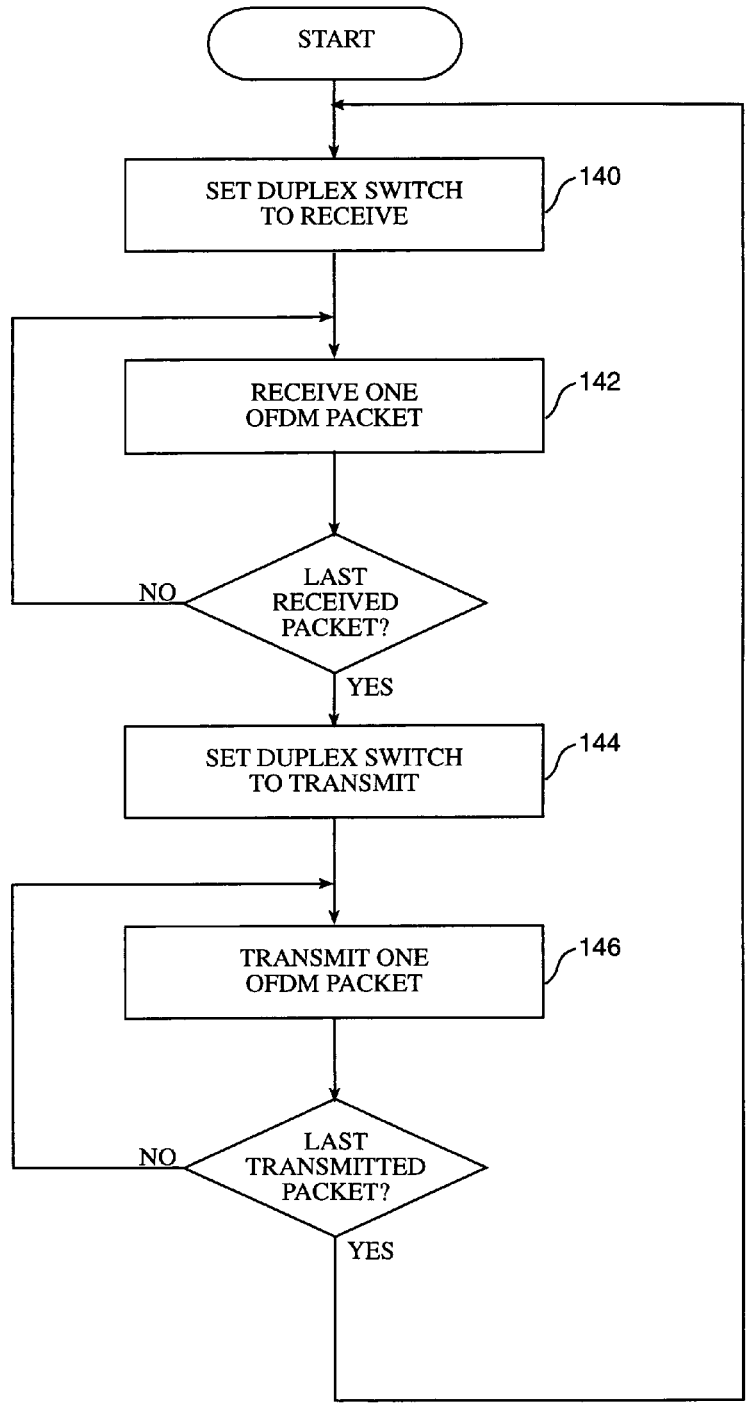
FIG. 8 shows a flow chart for the controller's program.

The procedure that the controller 14 follows is shown in FIG. 8. At 140, it sets the duplex switch 24 to the receive position in order to accept the uplink packets shown in FIG. 4. A single uplink packet is loaded and decoded at 142, and this step is repeated until all the uplink packets are received. The duplex switch 24 is then changed to the transmit position at 144 to prepare the base station for the downlink packets. A single downlink packet is transmitted at 146, and this is repeated until all of the downlink packets have been sent. The procedure repeats indefinitely. As it is running, the controller 14 maintains three tables. The first contains one entry for each terminal connected to the base station. Each entry is a list of the indices of the sub-carriers that are assigned to that terminal. The second table has one entry $P_i$ for each sub-carrier that represents the phase shift imposed on that carrier by the OFDM-codes (described later). The third table has one complex entry $C_i$ for each sub-carrier that represents the complex gain (amplitude and phase) of the radio channel. As the radio channel is dynamic, this table must be continually updated by the controller.

Figure 9:
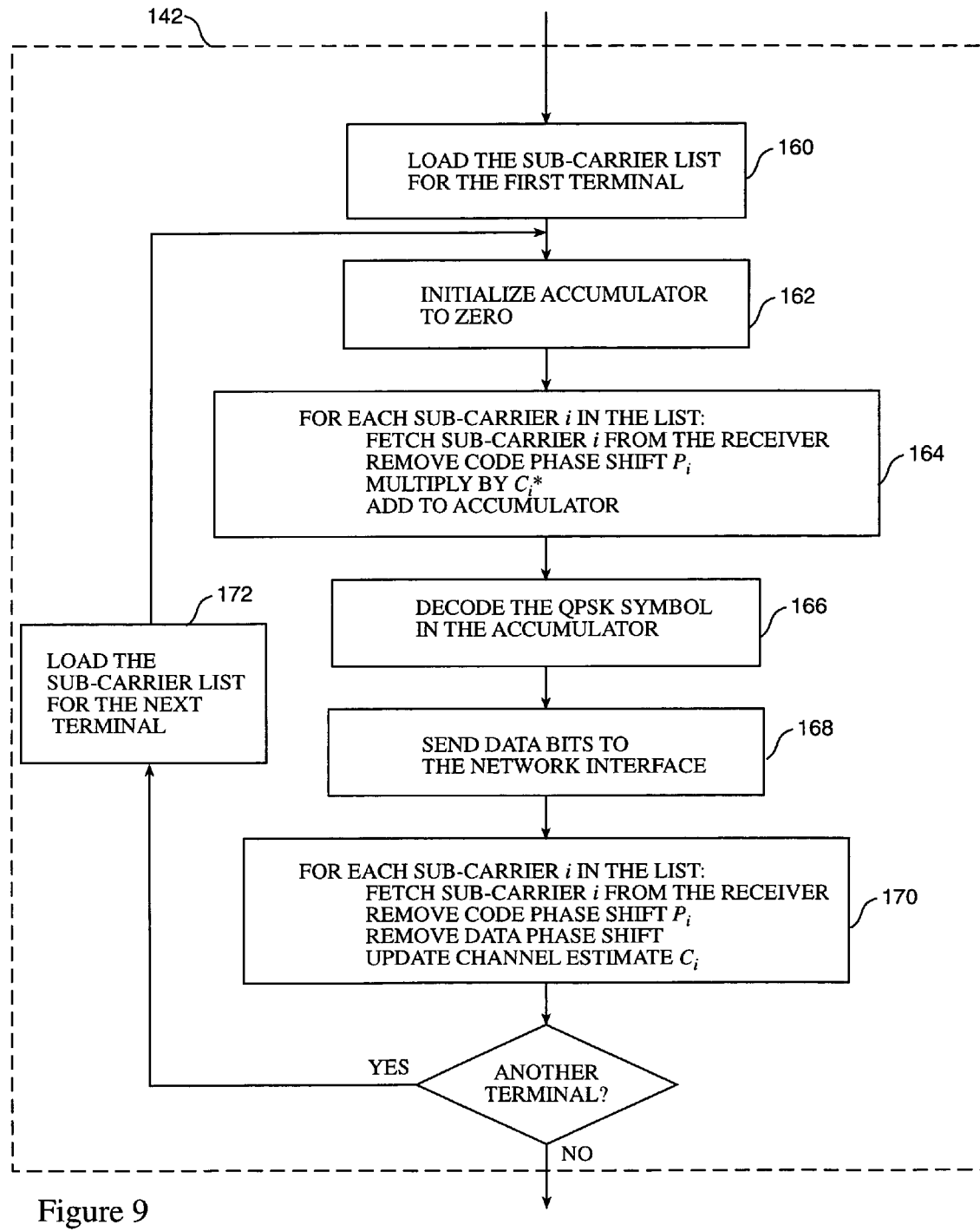
FIG. 9 shows a flow chart for the receive OFDM packet subroutine.

The details of the procedure to receive an OFDM packet 142 are shown in FIG. 9. The first terminal's sub-carrier list is loaded at 160. The controller must take each of the sub-carriers in this list and combine them using maximal ratio combining before recovering the data. To do this, the phases of the sub-carriers are rotated so that they combine constructively, and the amplitude of each sub-carrier is weighted by the magnitude of the corresponding channel gain. The phase of any given sub-carrier is made up of three components: the phase of the QPSK data symbol which is the same in each of the terminal's sub-carriers, the phase imposed by the OFDM-code which is different for each sub-carrier, and the phase shift caused by the radio channel which is different for each sub-carrier. Before the signals can be combined, the code phase shift and the channel phase shift must be removed. The maximal ratio combining procedure starts by initializing an accumulator to zero at 162. At 164, each of the sub-carriers in the terminal's list is fetched from the OFDM receiver's output buffer 130, the phase imposed by the code $P_i$ is removed, this is multiplied by the complex conjugate of the channel gain $C_i^*$ to remove the channel phase and apply the weighting factor, and the result is added to the accumulator. After all of the sub-carriers have been processed, the symbol in the accumulator is decoded using a QPSK decoder at 166. This results in two bits of information that is passed to the network interface 16 at 168.

The next step 170 is to update the channel coefficients $C_i$. Now that the data symbols are known from step 166, the phase shifts caused by both the OFDM-code and the data can be removed from the sub-carriers, leaving only the complex channel gain. This new channel gain estimate $\hat{C}_i$ is incorporated into the channel gain table with the following formula $$\alpha \hat{C}_i + (1-\alpha) \ C_i \to C_i \qquad 8$$

The constant $\alpha$ should be small enough that the noise in $\hat{C}_{l,k}$ does not seriously contaminate the channel set and large enough so that the base station can track the changes in the channel. The controller fetches the list of sub-carriers for the next terminal at 172 and continues processing the sub-carriers until the data from all of the terminals has been recovered.

Figure 10:
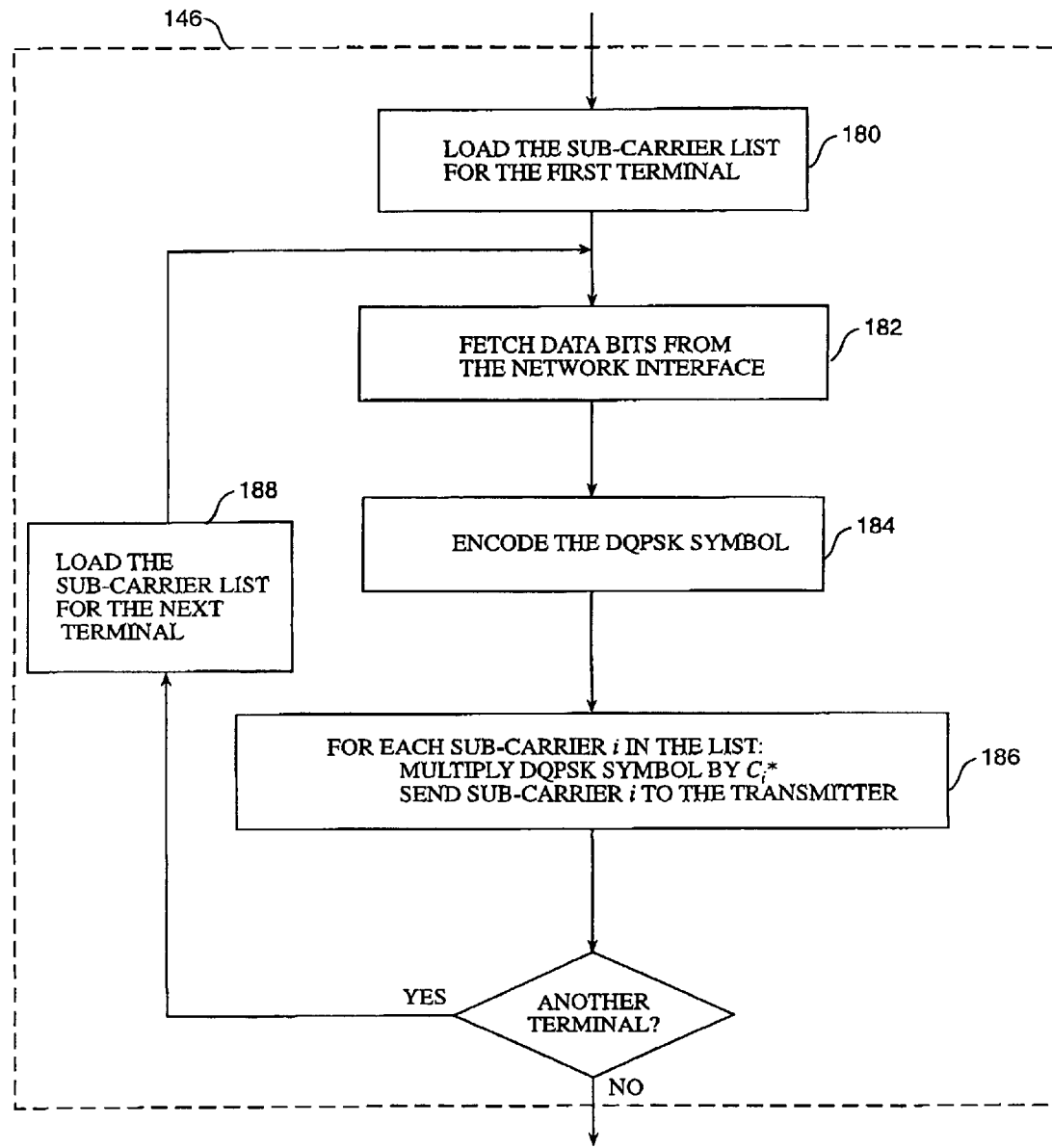
FIG. 10 shows a flow chart for the transmit OFDM packet subroutine.

FIG. 10 shows the details of the procedure 146 used by the controller 14 to transmit an OFDM packet to the terminals. The first terminal's sub-carrier list is loaded at 180. Two bits of data destined for this terminal are loaded from the network interface 16 at 182, and then are encoded into a DQPSK symbol at 184. The DQPSK symbol is transmitted simultaneously on each of the sub-carriers in the terminal's list so that they can be recombined within the terminal using maximal ratio combining. To make this happen, the magnitude of each sub-carrier must be weighted by the magnitude of the corresponding channel gain, and the phase of each sub-carrier must be rotated so that they add up constructively. Both the weighting and phase shift operations are done in step 186 by multiplying the DQPSK symbol by the complex conjugate of the channel gain $C_i^*$ corresponding to each sub-carrier in the list. The resulting sub-carriers are sent to the OFDM transmitter's memory buffer 100. The complex channel gains $C_i$ are already known from receiver step 170, and this same information is reused in step 186. Once all the sub-carriers are generated for this terminal, the controller fetches the list of sub-carriers for the next terminal at 188 and continues processing until the sub-carriers for all of the terminals are generated.

The processing done on the transmitted signal allows each terminal to recover and combine its sub-carriers with only the decimator 70 and accumulator 72 shown in FIG. 2. The decimator ($\downarrow$d) is a simple device that passes through every Mth sample and discards the rest. For a given input x(n), the decimated output y(n) is given by $$y(n) = x(Mn) \qquad 9$$

The frequency spectrum of the decimated sequence is given by $$Y(e^{j\omega}) = [X(e^{j\omega})]_{\downarrow M} = \frac{1}{M} \sum_{l=0}^{M-1} X(e^{j(\omega - 2\pi l)/M}). \qquad 10$$

Notice that the new frequency spectrum is made up of M frequency-scaled and frequency-shifted copies of the original spectrum. This property makes decimation an ideal operation for recombining su carriers within the terminal.

Figure 11:
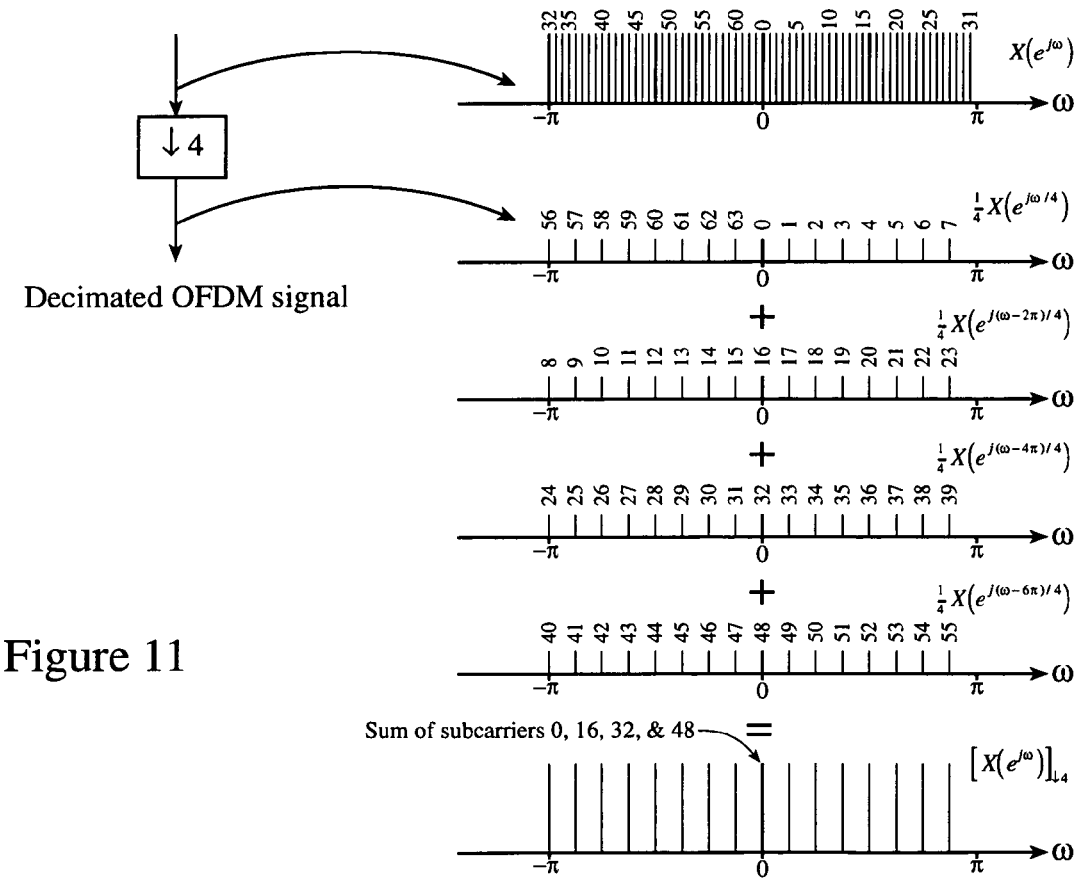
FIG. 11 illustrates how the decimator combines sub-carriers.

Say that the base station simultaneously transmits the terminal's message on the four sub-carriers shown in bold in FIG. 11. The sub-carriers are numbered according to their DFT index. The sub-carriers intended for this terminal are located at indices 0, 16, 32, and 48. After the terminal samples the signal, it decimates it by four (M=4). Decimation causes the spectrum to be divided into four parts, spread in frequency, and shifted in frequency. The four parts then combine to create a new spectrum with only 16 sub-carriers. The desired four sub-carriers, marked in bold, all combine at the zeroth sub-carrier. Since the phase of the sub-carriers was adjusted at the base station, the sub-carriers will combine constructively. The zeroth sub-carrier is trivial to recover since its discrete-time Fourier transform is given by $$X_0 = \sum_{n=0}^{\frac{N+N_G}{M}-1} x(n). \qquad 11$$

This is calculated by the terminal's accumulator 72.

Figure 12:
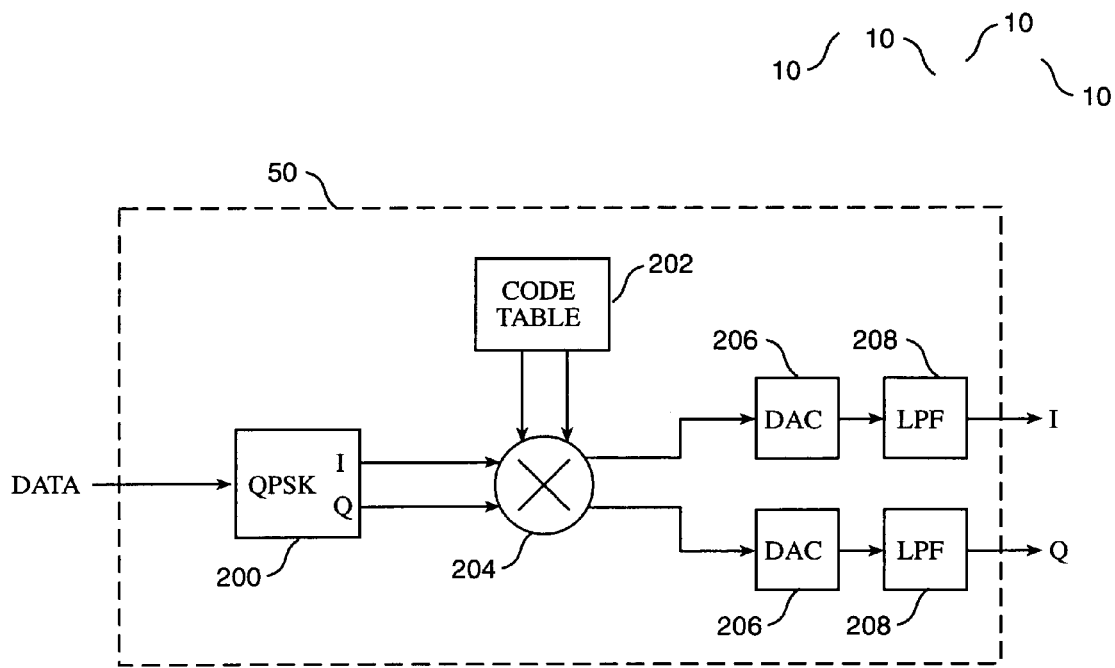
FIG. 12 is a schematic of the code generator.

FIG. 12 shows the details of the code generator 50. QPSK encoder 200 receives two bits of data from the terminal for each OFDM packet and converts them to a single QPSK symbol. For each OFDM packet, code table 202 outputs a pre-calculated series of QPSK symbols whose frequency spectrum contains one or more OFDM sub-carriers. Complex multiplier 204 combines the two signals to form the OFDM-code. The OFDM-code is passed though digital-to-analog converters 206 and lowpass antialiasing filters 208 to produce the analog OFDM output signal.

The specific code in table 202 depends on the application. There are two variables that can be controlled: N is the total length of the code, and R is the number of active sub-carriers in the code. To construct the code, start with the zeroth sub-carrier of length N/R as defined by Equation 4. For convenience, the signal is represented by its z-transform $$X_0(z) = m \sum_{n=0}^{N/R-1} z^{-n}. \qquad 12$$

The signal defined by Equation 12 contains one active sub-carrier at the zeroth position and N/R−1 vacant sub-carrier locations. Message m, the output of the QPSK encoder 200, is modulated on that sub-carrier. To create a signal with R active sub-carriers, replace the z in Equation 12 with $z^R$ to produce the following new signal $$X(z) = X_0(z^R) = m \sum_{n=0}^{N/R-1} z^{-Rn}. \qquad 13$$

Figure 13:
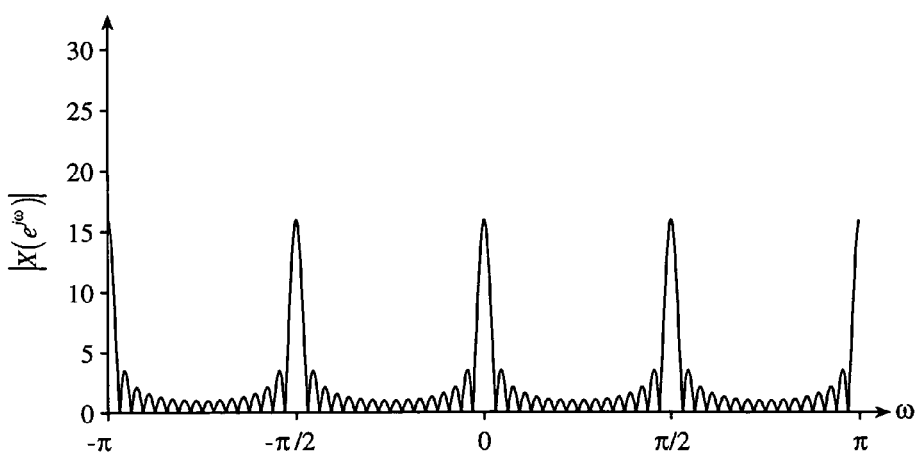
FIG. 13 shows the spectrum of an expanded signal.

What this does is the multirate signal processing operation of expansion, which has the effect of creating R copies of the original spectrum in the frequency domain. Now there is a total of R active sub-carriers and N−R vacant sub-carrier locations. For example, the coefficients of X(z) for N=64 and R=4 are $$x(n) = \{m, 0, 0, 0, m, 0, 0, 0, m, 0, 0, 0, m, 0, 0, 0, \qquad 14$$
$$m, 0, 0, 0, m, 0, 0, 0, m, 0, 0, 0, m, 0, 0, 0,$$
$$m, 0, 0, 0, m, 0, 0, 0, m, 0, 0, 0, m, 0, 0, 0,$$
$$m, 0, 0, 0, m, 0, 0, 0, m, 0, 0, 0, m, 0, 0, 0\}$$

and the spectrum of the signal is shown in FIG. 13. As expected, there are four occupied sub-carriers and sixty vacant ones for other terminals to use.

The problem with the method above is power. OFDM signals get their processing gain by repeating the same information over again for many samples. In the code defined by Equation 14, three out of every four samples are zero and therefore the code only has one quarter of the power of a code where all the symbols are filled. This drop in power can be avoided by using a base code of length R, as defined by $$B(z) = \sum_{n=0}^{R-1} b(n)z^{-n}, \qquad 15$$

where the coefficients b(n) belong to the set {1, j, −1, −j}. When the base code polynomial is multiplied by the polynomial defined in Equation 13, the base code fills in the empty space in the OFDM signal to produce the following $$X_C(z) = \qquad 16$$

$$X(z)B(z) = m\left[\sum_{n=0}^{N/R-1} z^{-Rn}\right]\left[\sum_{p=0}^{R-1} b(p)z^{-p}\right] = m\sum_{n=0}^{N/R-1}\sum_{p=0}^{R-1} b(p)z^{-(Rn+p)}.$$

Figure 14:
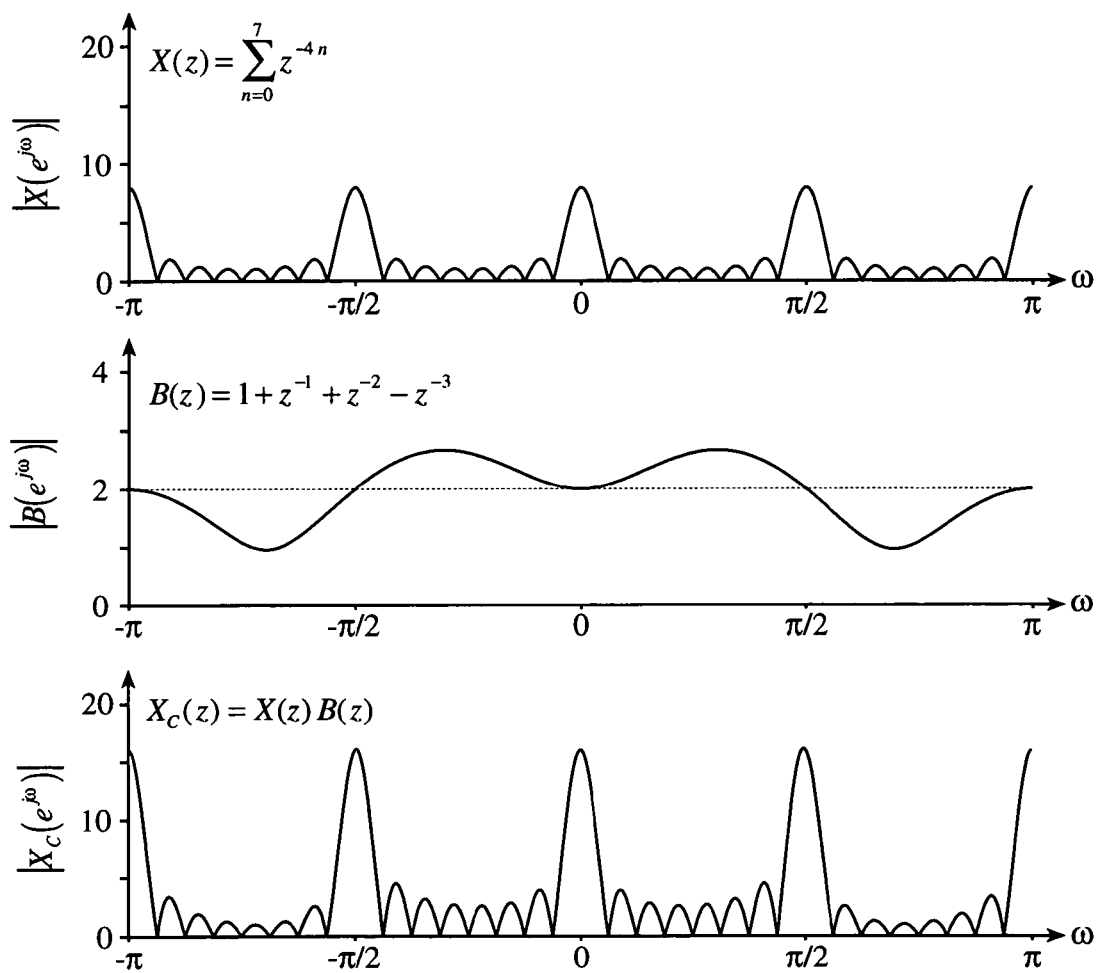
FIG. 14 shows the relationship between the components of an OFDM-code.

The coefficients of the OFDM-code $x_c(n)$ are the base code coefficients b(n) multiplied by the message symbol m and repeated N/R times. The spectrum of the OFDM-code is a product of the spectra of the OFDM signal $X(e^{j\omega})$ and the base code $B(e_{j\omega})$ and is shown in FIG. 14 (for N=32, R=4). The OFDM signal spectrum $X(e^{j\omega})$ defines the shape of the OFDM-code spectrum with its R occupied sub-carriers and N-R null sub-carriers. The base code spectrum $B(e^{j\omega})$ amplifies the power of the occupied sub-carriers. In most cases it is desirable to boost the magnitude of all of the diversity carriers by the same amount, therefore the base code coefficients are chosen so that the magnitude of $B(e^{j\omega})$ is the same at the frequency of each of the occupied sub-carriers. The phase of $B(e^{j\omega})$ at each of the sub-carrier frequencies defines the code phase shift parameters $P_i$ used by the controller 14 during demodulation.

An example OFDM-code is derived for N=64 and R=4 as follows. Since the result has four sub-carriers at frequencies 0, π/2, π, and −π/2, the base code should have equal amplitude at each of these frequencies, i.e.

$$|B(e_{j0})|=|B(e^{j\pi/2})|=|B(e^{j\pi})|=|B(e^{-j\pi/2})|. \qquad 17$$

The length four Frank-Heimiller code given by $$b(n)=\{1, 1, 1, -1\} \qquad 18$$

meets these specifications and has a constant magnitude of two at the sub-carrier frequencies. The code phase shifts $P_i$ for the four sub-carriers are 0, π/2, 0, and 3π/2 radians respectively. The OFDM-code is evaluated from Equation 16 to return the following coefficients $$x_C(n) = \{m, m, m, -m, m, m, m, -m, m, m, m, -m, m, m, m, -m, \qquad 19$$

$$m, m, m, -m, m, m, m, -m, m, m, m, -m, m, m, m, -m,$$

-continued
$$m, m, m, -m, m, m, m, -m, m, m, m, -m, m, m, m, -m,$$

$$m, m, m, -m, m, m, m, -m, m, m, m, -m, m, m, m, -m,\}.$$

Figure 15:
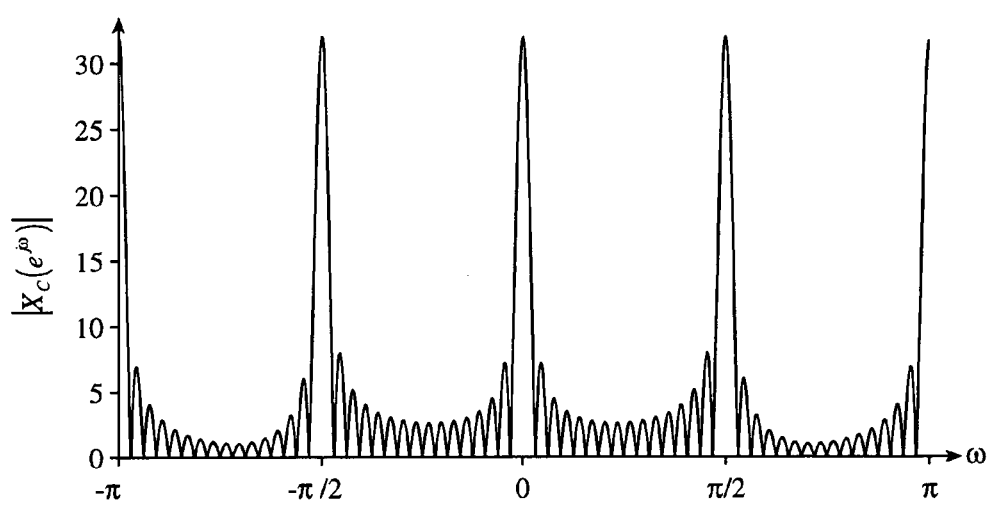
FIG. 15 shows the spectrum of an OFDM-code in the preferred embodiment.

FIG. 15 shows the frequency spectrum of this signal. The result is an OFDM signal with a total of 64 sub-carriers and, as predicted, four of the sub-carriers are occupied with equal amplitude signals and the remainder are empty and available for use by other terminals. The spectral shape of the signal in FIG. 15 is identical to that in FIG. 13, however the code that generated it has four times as much energy.

Table 1 shows perfect base codes for R values of one, two, four, eight, and sixteen. To generate the symbols for code table 202, choose a base code of length R and repeat it a total of N/R times. A perfect base code is defined as a code whose spectrum has the same amplitude at each of the sub-carrier locations. The table lists all the fundamental perfect base codes. Other perfect codes can be generated from these fundamental codes by applying one or more of the following operations:

1. Multiplying every element of the code by −1, j, or −j.
2. Rotating the elements of the code by any amount. For example turning {b(0), b(1), b(2), b(3)} into {b(3), b(0), b(1), b(2)}.
3. Time reversing the elements of the code. For example turning {b(0), b(1), b(2), b(3)} into {b(3), b(2), b(1), b(0)}
4. Taking the complex conjugate of each element in the code.

Figure 16:
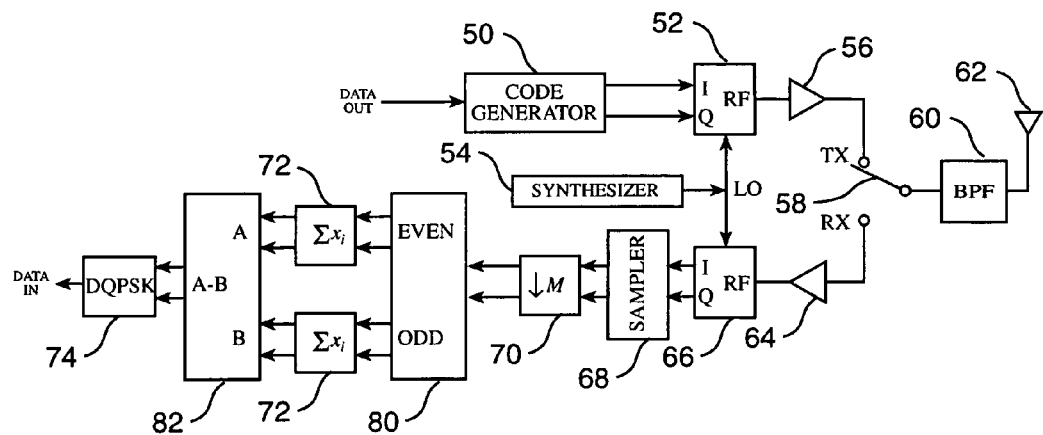
FIG. 16 is a schematic of the terminal in the alternate embodiment.

An alternate embodiment of the terminal is shown in FIG. 16. This particular embodiment is useful when the value of N is very large. Within the receiver's quadrature demodulator 32, some of the synthesizer's signal can leak into the signal input and be downconverted to dc. This is known as carrier-feedthrough. The result of this is a small dc offset at the output of the mixer. Under normal circumstances, the offset is negligible, however when many samples are summed to calculate the zeroth sub-carrier, the errors accumulate and may overpower the actual signal.

The solution is to change the position of the sub-carriers so that they arrive at a frequency other than dc. Sub-carrier N/2—which is at the Nyquist frequency—is almost as trivial to recover as the zeroth sub-carrier. The DFT formula at the Nyquist frequency is $$X_{N/2} = \sum_{n=0}^{N-1} x(n)W_N^{Nn/2} = \sum_{n=0}^{N-1} x(n)(-1)^n. \qquad 20$$

Therefore, $X_{N/2}$ is calculated by alternately adding and subtracting samples. The terminal in FIG. 16 contains two accumulators 72 instead of the one shown in FIG. 2. A switch 80 routes all the even index samples to one accumulator and all the odd index samples to the other. The difference of the two accumulators calculated by 82 is the output of Equation 20, which is the sub-carrier at the Nyquist frequency. This method avoids the dc sub-carrier completely, so carrier-feedthrough is not a factor.

Since the position of the sub-carriers have changed, the OFDM-codes used for the alternate embodiment are also different. These codes are generated by following the same procedure as above. First the z-transform of the Nyquist frequency sub-carrier of length N/R $$X_{N/2R}(z) = m \sum_{n=0}^{N/R-1} (-1)^n z^{-n} \qquad (21)$$

is expanded by R $$X(z) = X_{N/2R}(z^R) = m \sum_{n=0}^{N/R-1} (-1)^n z^{-Rn} \qquad (22)$$

to form an OFDM signal with R active sub-carriers and N−R null sub-carriers. That polynomial is then multiplied by the base code B(z) defined in Equation 15

$$X_C(z) = X(z)B(z) = m \left[ \sum_{n=0}^{N/R-1} (-1)^n z^{-Rn} \right] \left[ \sum_{p=0}^{R-1} b(p) z^{-p} \right] \qquad (23)$$

$$= m \sum_{n=0}^{N/R-1} \sum_{p=0}^{R-1} (-1)^n b(p) z^{-(Rn+p)}$$

to generate the OFDM-code. Note that the coefficients of the OFDM-code described by Equation 23 are identical to those described by Equation 16 except that when the base code is repeated, every alternate base code is negative. The base codes will also be different since the frequencies that the sub-carriers occupy are different.

Repeating the example from the previous section with N=64 and R=4 results in the following. Since the four sub-carriers now appear at frequencies π/4, 3π/4, −3π/4, and −π/4, the base code should have equal amplitude at each of these frequencies, i.e.

$$|B(e^{j\pi/4})|=|B(e^{j3\pi/4})|=|B(e^{j3\pi/4})|=|B(e^{-j\pi/4})|. \qquad (24)$$

The code given by $$b(n)=\{1, 1, j, -j\} \qquad (25)$$

meets these specifications. The OFDM-code is evaluated from Equation 23 to get the following coefficients $$x_C(n) = \{m, m, jm, -jm, -m, -m, -jm, jm, m, m, \qquad (26)$$
$$jm, -jm, -m, -m, -jm, jm,$$
$$m, m, jm, -jm, -m, -m, -jm, jm, m, m,$$
$$jm, -jm, -m, -m, -jm, jm,$$
$$m, m, jm, -jm, -m, -m, -jm, jm, m, m,$$
$$jm, -jm, -m, -m, -jm, jm,$$
$$m, m, jm, -jm, -m, -m, -jm, jm, m, m,$$
$$jm, -jm, -m, -m, -jm, jm\}.$$

Figure 17:
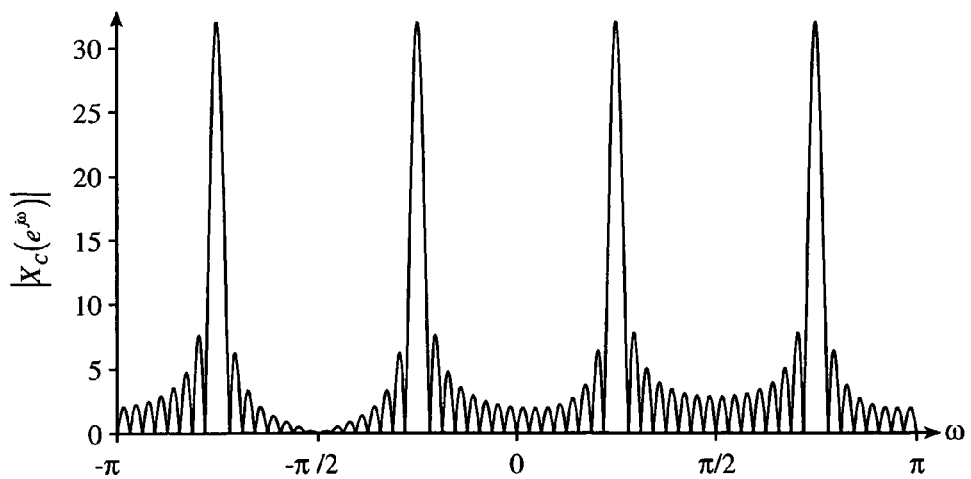
FIG. 17 shows the spectrum of an OFDM-code in the alternate embodiment.

The frequency spectrum of this code is shown in FIG. 17, and clearly shows the four occupied sub-carriers, all shifted away from dc, and the sixty null sub-carriers.

The fundamental perfect base codes for the alternate embodiment are shown in Table 2 for values of R of one, two, and four. No perfect codes exist for R of eight and sixteen so near-perfect base codes are shown for these values. To generate the symbols for the code table 202 in this embodiment, choose a base code of length R and repeat the positive base code, followed by the negative of the base code, followed by the positive base code, etc. a total of N/R times.

Immaterial modifications may be made to the preferred embodiment disclosed here without departing from the essence of the invention.

TABLE 1

| R | Base Code b(n) |
|---|---|
| 1 | {1} |
| 2 | {1, j} |
| 4 | {1, 1, 1, −1} |
|   | {1, j, 1, −j} |
| 8 | {1, 1, 1, j, −1, 1, −1, j} |
|   | {1, 1, j, 1, 1, −1, j, −1} |
| 16 | {1, 1, 1, 1, 1, j, −1, −j, 1, −1, 1, −1, 1, −j, −1, j} |
|   | {1, 1, 1, 1, 1, j −j, −1, 1 −1 −1, 1, 1 −j, j −1} |
|   | {1, 1, 1, 1, j, 1 −j −1 −1, 1 −1, 1 −j, 1, j −1} |
|   | {1, 1, 1, 1, j, 1 −1 −j −1, 1, 1 −1 −j, 1 −1, j} |
|   | {1, 1, 1, 1, j −j, 1 −1 −1 −1, 1, 1 −j, j, 1 −1} |
|   | {1, 1, 1, j, 1, j −j −j, 1 −1 −1, j, 1 −j, j −j} |
|   | {1, 1, 1, j, 1, j −1,1,1,−1, 1 −j, 1 −j −1 −1} |
|   | {1, 1, 1, j, 1 −j, j −j, 1 −1 −1, j, 1, j −j −j} |
|   | {1, 1, 1, j, 1 −1, j, 1, 1, 1 −1 −j, 1 −1 −j −1} |
|   | {1, 1, 1, j, j, 1 −j −j −1, 1 −1, j, 1, j −j} |
|   | {1, 1, 1, j, j, 1, −1, 1, −1, 1, 1, j, −j, −j, 1, −1, −1} |
|   | {1, 1, 1, j, j, −j, −1, j, −1, −1, 1, j, −j, j, −1, j} |
|   | {1, 1, 1, j, j, −1, 1, 1, −1, 1, 1, −j, −j, −1, 1, −1} |
|   | {1, 1, 1, j, j, −1, −j, j, −1, 1, −1, j, −j, −1, j, j} |
|   | {1, 1, 1, j, −j, j, −1, 1, −1, j, j, −j, −1, j, j} |
|   | {1, 1, 1, j, −j, −1, j, j, −1, 1, −1, j, j, −1, −j, j} |
|   | {1, 1, 1, j, −1, j, 1, 1, 1, −1, j, −1, −j, 1, −1} |
|   | {1, 1, 1, −1, j, −1, −j, −1, −1, 1, −1, −1, −j, −1, j−1} |
|   | {1, 1, j, 1, 1, j, 1, −1, 1, −1, −j, 1, 1, −j, −1, −1} |
|   | {1, 1, j, 1, 1, j, −j, 1, −1, j, −1, 1, −j, −j, j} |
|   | {1, 1, j, 1, 1, −j, −j, j, 1, −1, j, 1, j, −j, −j} |
|   | {1, 1, j, 1, 1, −j, −1, −1, 1, −1, −j, 1, 1, j, 1, −1} |
|   | {1, 1, j, 1, j, 1, −1, −1, 1, −j, 1, −j, 1, −1, −1} |
|   | {1, 1, j, 1, j, 1, −j, −j, 1, 1, j, −1, −1, 1, −j, j} |
|   | {1, 1, j, 1, 1, −1, j, −j, −1, 1, j, −1, −j, −1, j, j} |
|   | {1, 1, j, 1, −j, j, −j, −1, 1, j, −1, j, 1, −j, −j} |
|   | {1, 1, j, 1, −j, −1, j, j, −1, 1, j, −1, j, −j, j} |
|   | {1, 1, j, 1, −1, j, j, −1, 1, −1, j, −1, −j, j} |

TABLE 2

| R | Base Code b(n) |
|---|---|
| 1 | {1} |
| 2 | {1, 1} |
|   | {1, −1} |
| 4 | {1, 1, j, −j, } |
|   | {1, j, j, 1} |
|   | {1, j, −j, −1} |
| 8 | {1, 1, 1, 1, j, −1, 1, −j} |
| 16 | {1, 1, 1, 1, j, −j, −1, 1, j, −1, 1, −j, −1, 1, j, −j} |

I claim:

1. A communication method, comprising the steps of:
(a) receiving an information bearing OFDM signal at a receiver, where information in the information bearing OFDM signal is carried by each sub-carrier of a set of sub-carriers allocated to the receiver;
(b) constructively combining the sub-carriers at the receiver to produce a combined signal, wherein M sub-carriers are in the set of sub-carriers and constructively combining the sub-carriers comprises the steps of:

(i) sampling the information bearing OFDM signal to generate a sampled signal having a spectrum and being formed of samples;

(ii) decimating the sampled signal by retaining each Mth sample and discarding each other sample to produce a decimated signal formed of M frequency scaled and frequency shifted copies of the spectrum of the sampled signal; and (iii) recovering the combined signal by accumulating the samples at a selected frequency; and (c) extracting the information from the combined signal.

2. The communication method of claim 1 in which the selected frequency is zero and accumulating the samples comprises summing the samples.

3. The communication method of claim 1 in which the selected frequency is the Nyquist frequency, the samples include alternating odd and even samples and accumulating the samples comprises the step of finding the difference between the sum of the odd samples and the sum of the even samples.

4. The communication method of claim 1 further comprising transmitting the information bearing OFDM signal from a transmitter to the receiver, wherein in transmitting the information bearing OFDM signal comprises phase rotating the sub-carriers so that the sub-carriers add constructively at the receiver.

5. The communication method of claim 4 in which each sub-carrier is associated with a corresponding channel, and each corresponding channel has a gain, and the gain of each corresponding channel has a magnitude, and in which transmitting the information bearing OFDM signal further comprises weighting each sub-carrier with the magnitude of the channel corresponding to the sub-carrier.

6. An OFDM transmitter, comprising:
a source of OFDM data packets;
a code table having as output code symbols whose frequency spectrum contains one or more OFDM sub-carriers; and
a multiplier connected to each of the source of OFDM data packets and the code table for multiplying the data packets by the code symbols.

7. The OFDM transmitter of claim 6 in which the code symbols form a number of repetitions of a base code sequence.

8. The OFDM transmitter of claim 7 in which the base code sequence comprises plural base codes, each base code has a base code spectrum, each spectrum has a magnitude, and the base code sequence is selected so that the magnitude of each base code spectrum is the same at each of the OFDM sub-carriers.

9. The OFDM transmitter of claim 7 further comprising:
a digital to analog converter connected to receive output from the multiplier; and
a low pass filter connected to receive output from the digital to analog converter.

10. The OFDM transmitter of claim 9 further comprising an RF converter connected to receive output from the low pass filter.

11. An OFDM receiver for receiving an information bearing OFDM signal transmitted over plural OFDM sub-carriers, comprising:

an OFDM sampler having samples as output;
a decimator connected to receive the samples from the OFDM sampler and retain each Mth sample while discarding all other samples;
an accumulator connected to receive each Mth sample from the decimator and having as output summed decimated samples corresponding to a constructive combination of the OFDM sub-carriers.

12. A wireless terminal incorporating an OFDM transmitter and an OFDM receiver, the OFDM transmitter comprising:
a source of OFDM data packets;
a code table having as output code symbols whose frequency spectrum contains one or more OFDM sub-carriers, the code symbols being formed from a number of repetitions of a base code sequence;
a multiplier connected to each of the source of OFDM data packets and the code table for multiplying the data packets by the code symbols;
a digital to analog converter connected to receive output from the multiplier;
a low pass filter connected to receive output from the digital to analog converter; and
an RF converter connected to receive output from the low pass filter.

13. The wireless terminal of claim 12 in which the base code sequence comprises plural base codes, each base code has a base code spectrum, each spectrum has a magnitude, and the base code sequence is selected so that the magnitude of each base code spectrum is the same at each of the OFDM sub-carriers.

14. The wireless terminal of claim 12 in which the OFDM receiver comprises:
an OFDM sampler having samples as output;
a decimator connected to receive the samples from the OFDM sampler and retain each Mth sample while discarding all other samples;
an accumulator connected to receive each Mth sample from the decimator and having as output summed decimated samples corresponding to a constructive combination of the OFDM sub-carriers.

15. A method of receiving an information bearing OFDM signal transmitted from multiple terminals using sub-carriers allocated to the terminals, the sub-carriers each being transmitted over a corresponding radio channel, wherein each terminal encodes the information bearing OFDM signal with code symbols that have the effect of rotating the phase of the information bearing OFDM signal, the method comprising the steps of:
for each terminal, recovering the values of each sub-carrier allocated to the terminal with a discrete Fourier transform;
phase rotating the sub-carriers to remove phase shifts caused by the radio channel corresponding to the sub-carrier and the code symbols;
weighting each sub-carrier with the magnitude of the corresponding radio channel; and
constructively combining the sub-carriers allocated to the terminal.

* * * * *